United States Patent
Pelman et al.

(10) Patent No.: US 11,090,883 B2
(45) Date of Patent: Aug. 17, 2021

(54) FIXTURE AND METHOD FOR USE IN A MOLDING PROCESS

(71) Applicant: Arris Composites Inc., Berkeley, CA (US)

(72) Inventors: Todd Pelman, Moss Beach, CA (US); Kameron Butler, San Francisco, CA (US); Adam Hansel, Berkeley, CA (US); Erick Davidson, Piedmont, CA (US); Riley Reese, Carpinteria, CA (US); Ethan Escowitz, Berkeley, CA (US); Cory Bloome, San Francisco, CA (US); Alexander Darrow, San Francisco, CA (US); Ryan Satcher, San Francisco, CA (US); J. Scott Perkins, Oakland, CA (US)

(73) Assignee: Arris Composites Inc.

( * ) Notice: Subject to any disclaimer, the term of this patent is extended or adjusted under 35 U.S.C. 154(b) by 0 days.

(21) Appl. No.: 16/877,236

(22) Filed: May 18, 2020

(65) Prior Publication Data
US 2020/0361122 A1    Nov. 19, 2020

Related U.S. Application Data

(60) Provisional application No. 62/849,611, filed on May 17, 2019.

(51) Int. Cl.
*B29C 70/54* (2006.01)
*B29B 11/14* (2006.01)
(Continued)

(52) U.S. Cl.
CPC ............ *B29C 70/543* (2013.01); *B29B 11/14* (2013.01); *B29C 65/02* (2013.01); *B29C 66/721* (2013.01); *B29C 66/73921* (2013.01)

(58) Field of Classification Search
CPC . B29C 33/44; B29C 66/721; B29C 66/73921; B29C 70/462; B29C 70/24;
(Continued)

(56) References Cited

U.S. PATENT DOCUMENTS

| | | |
|---|---|---|
| 3,943,030 A | 3/1976 | Olsen et al. |
| 5,342,679 A | 8/1994 | Aochi et al. |

(Continued)

FOREIGN PATENT DOCUMENTS

| | | | |
|---|---|---|---|
| EP | 1852245 | 11/2007 | |
| WO | WO-2017029121 A1 * | 2/2017 | ............ B29C 70/12 |

OTHER PUBLICATIONS

Authorized Officer Gasner, Benoit, International Search Report and Written Opinion dated Nov. 12, 2020 issued in PCT Patent Application No. PCT/US2020/033480.

*Primary Examiner* — John L Goff, II
(74) *Attorney, Agent, or Firm* — Kaplan Breyer Schwarz, LLP

(57) ABSTRACT

A preform-charge fixture creates a preform charge, which is a partially consolidated assemblage of preforms that can be efficiently transferred to a mold to create a finished part in a molding process, such as compression molding. In the illustrative embodiment, the preform-charge fixture includes peripheral cleats that are movable towards a central cleat to create a small gap therebetween that receives and constrains preforms in a desired position. The fixture also includes clamps, which are operable to engage an uppermost layer of preforms in the gap and apply a slight amount of downward pressure thereto to assure that the preforms are properly seated. The fixture also accommodates an energy source that heats the preforms so that, in conjunction with downforce applied by the clamps and/or gravity, the preforms can be tacked together, forming the preform charge.

16 Claims, 12 Drawing Sheets

(51) Int. Cl.
*B29C 65/00* (2006.01)
*B29C 65/02* (2006.01)

(58) Field of Classification Search
CPC ... B29C 70/347; B29C 70/541; B29C 70/543; B29C 65/02; B29D 28/005; B29B 11/14; B29B 11/16
See application file for complete search history.

(56) References Cited

U.S. PATENT DOCUMENTS

| | | |
|---|---|---|
| 10,287,719 B2 | 5/2019 | Endres et al. |
| 2005/0093188 A1 | 5/2005 | Forest et al. |
| 2020/0108529 A1 | 4/2020 | Davidson et al. |
| 2020/0108568 A1 | 4/2020 | Davidson et al. |
| 2020/0114596 A1 | 4/2020 | Davidson et al. |
| 2020/0130297 A1 | 4/2020 | Escowitz et al. |

* cited by examiner

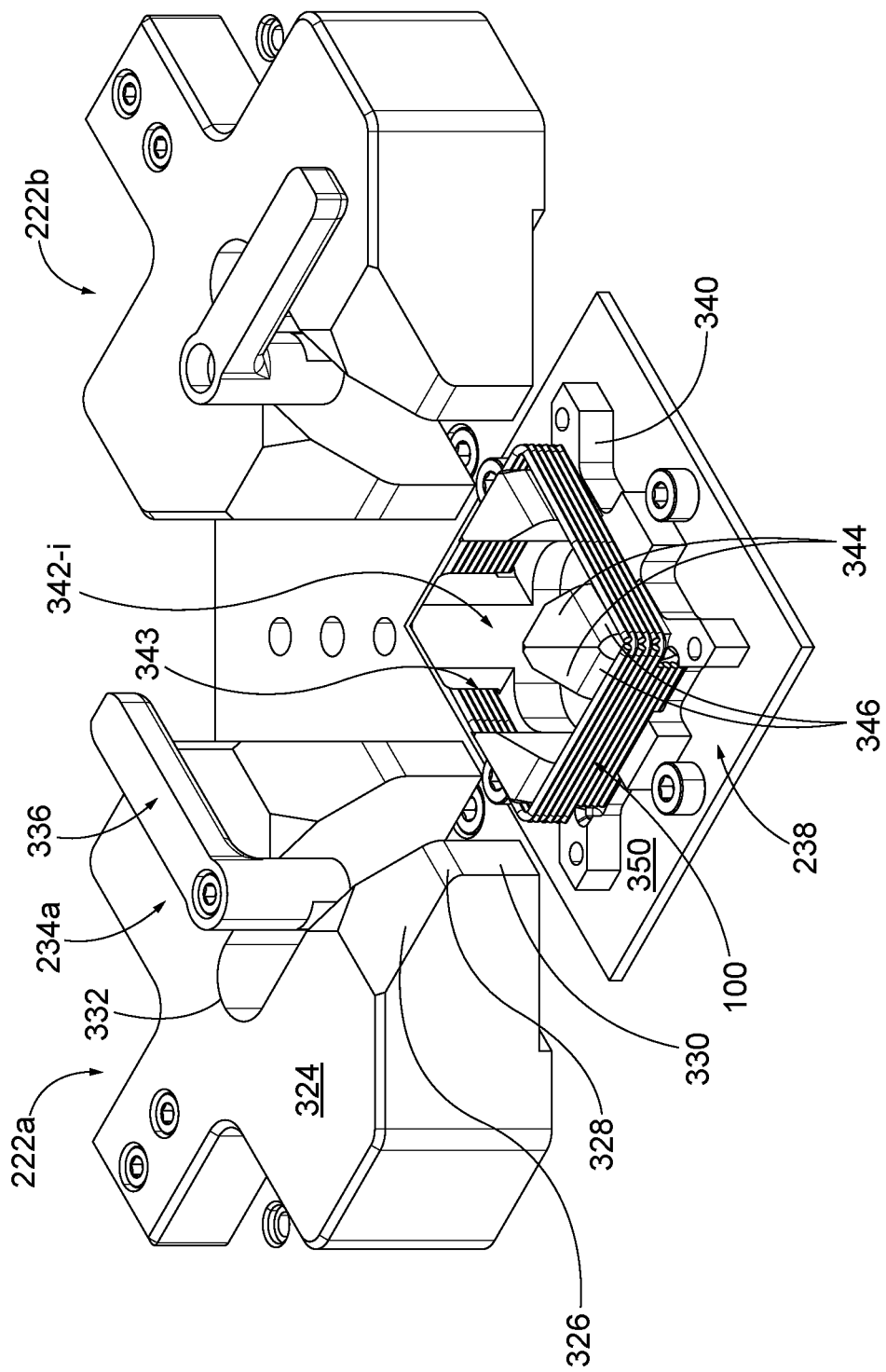

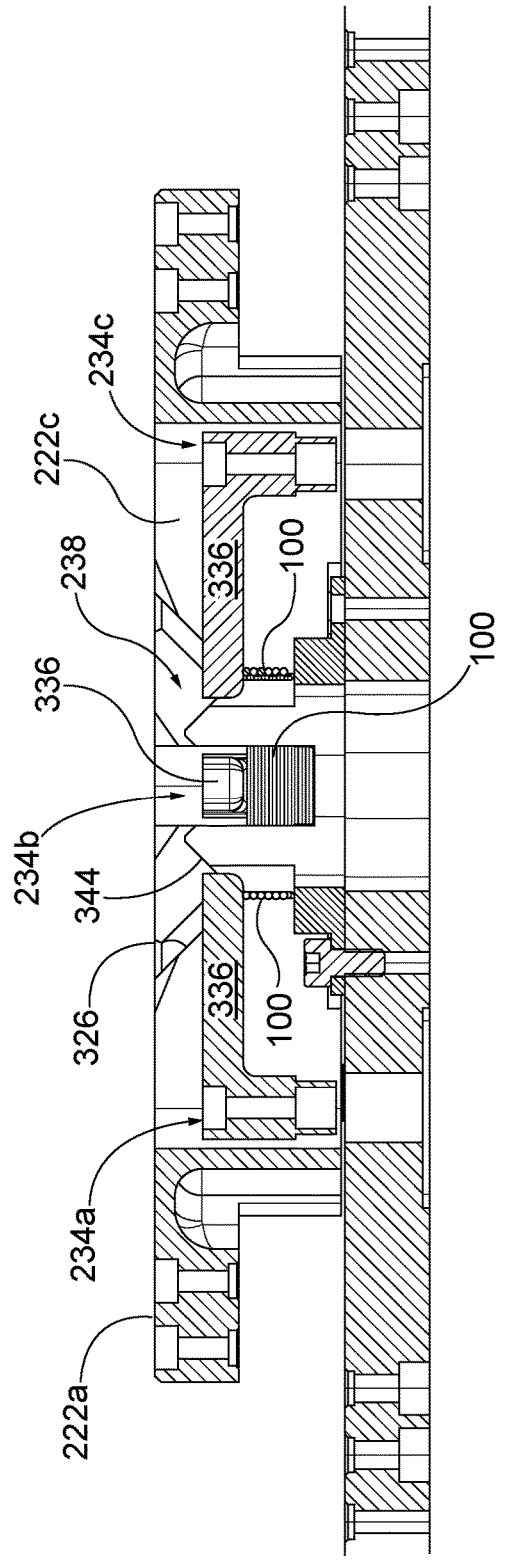
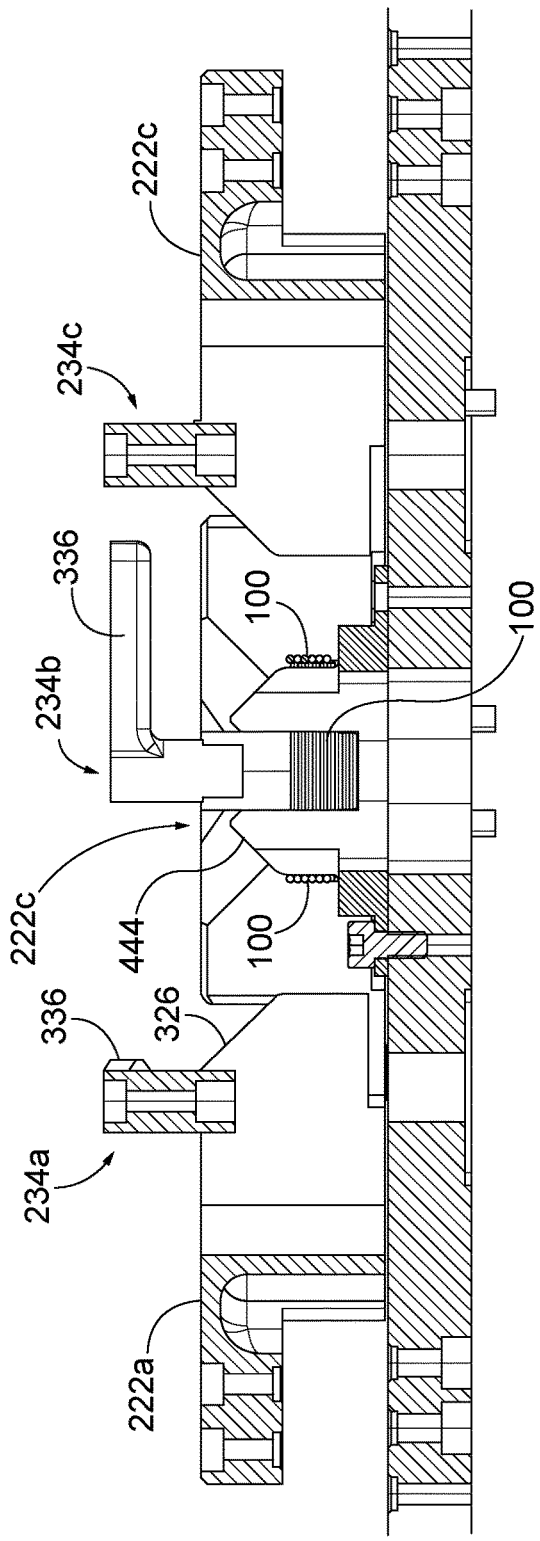

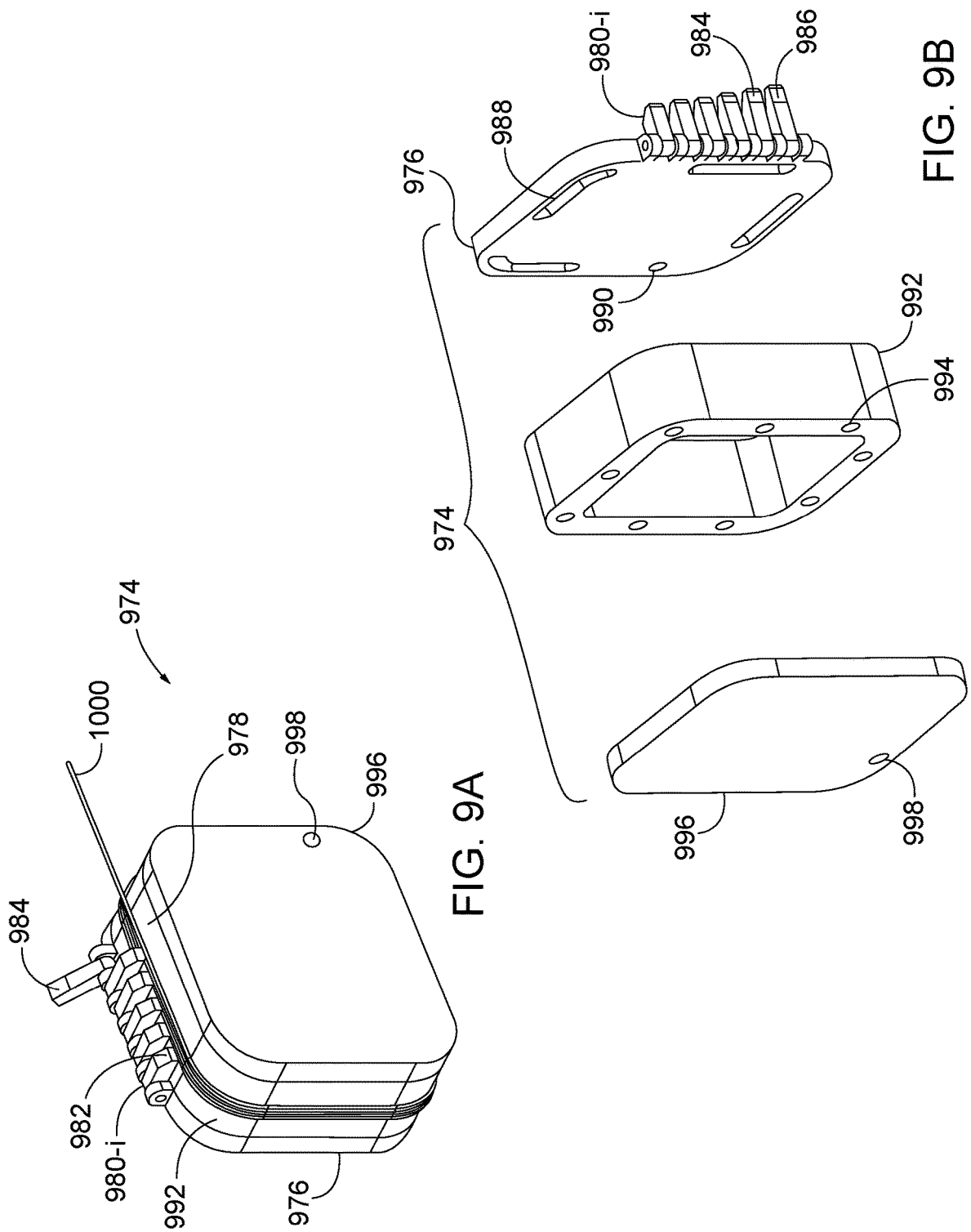

FIXTURE AND METHOD FOR USE IN A MOLDING PROCESS

STATEMENT OF RELATED CASES

This specification claims priority to U.S. Patent Application 62/849,611 filed May 17, 2019, and which is incorporated herein by reference.

FIELD OF THE INVENTION

The present invention relates to additive molding of fiber-composite materials.

BACKGROUND

There is a demand for high-volume, low-cost components ("parts") that are made of fiber-composite materials, due to the superior material attributes (e.g., high strength with low mass, etc.) thereof.

Fiber composites include two primary components: a matrix material and a fibrous material. The fibrous material—fibers—are typically responsible for the strength of the composite, in addition to any other properties they contribute to the composite. The matrix, formed from a polymer resin, surrounds and supports the fibers, maintaining their relative positions and preventing abrasion and environmental attack thereof. The combination of the fibers and resin is synergistic, although the resulting properties are to some extent unpredictable.

Current methods for producing large quantities of such fiber-composite parts typically involve "lay-up" of sheets of material. Lay-up is costly as well as limiting in terms of an inability to align fibers independently within a sheet of material. The alignment of fibers within composites along directions of principal stress is an important consideration in deriving the maximum performance for a composite part.

The art would therefore benefit from a way to efficiently and cost effectively produce high-volume, fiber-composite parts wherein the fibers can be aligned for maximum part performance.

SUMMARY

The present invention provides a way to speed the production, via compression molding, of high-volume, fiber-composite parts having appropriately aligned fibers.

The properties of a fiber-composite part are a function of, among any other parameters, the type, geometry, and relative orientation of its constituent materials. Applicant has been developing techniques that improve the level of control available over such parameters. For example, applicant has disclosed the use of "preforms" for fabricating parts. A preform is a sized, or sized and shaped fiber bundle impregnated with resin. The preforms may then be added to a mold to produce a part. Adding preforms, one-by-one, to a mold provides an ability to tailor, with great specificity, fiber alignment within a mold. See, for example, Published Patent Applications US2020/0108529, US2020/0108568, US2020/0130297, and U.S. patent application Ser. No. 16/857,710.

Despite the flexibility in fiber alignment offered by the use of preforms, placing individual preforms in a mold one-by-one is inefficient. Furthermore, after placement in a mold, individual preforms may move out of their desired position/alignment. And once the mold is closed, it is typically not possible to determine if such movement has occurred. To address this issue, applicant developed the "preform charge." A preform charge is an assemblage of preforms, formed by "tacking" together plural preforms. The preform charge thus effectively becomes a single unit. See, for example, Published Patent Application US2020/0114596.

In accordance with the present teachings, a preform-charge fixture is used to provide an accurate and repeatable assembly of fiber-composite preforms and/or other fiber-composite constituent elements; that is, a preform charge.

Embodiments of a preform-charge fixture in accordance with the invention can be operated manually, or in semi- or fully-automated manner to position and constrain preforms, or even virgin towpreg (i.e., material that is not sized or shaped) in a preferred orientation relative to each other. These fiber constituents are then joined together. In some embodiments, the preform fixture is capable of joining the constituents, such as via an energy source. In some other embodiments, a complementary process, rather than the preform-charge fixture itself, performs the joining/tacking operation. After the preform charge is formed, it is removed from the preform-charge fixture and placed in a mold to create a part.

In some embodiments, the preform-charge fixture includes a plate, cleats, clamps, and, optionally, an energy source. The plate accurately locates the cleats relative to each other, enabling the cleats to guide and position the fiber constituents into a proper location/orientation. The one or more clamps are then used to stabilize the preforms in place, prior to tacking. And the energy source is used to join the properly-sited and constrained preforms to one another. In some embodiments, the preform-charge fixture is structured to operate with cleats but without clamps, and in some further embodiments the preform-charge fixture is structured to operate without cleats, but with clamps.

Using a preform-charge fixture, a preform charge is assembled outside of a mold. Consequently, it can be readily inspected, such as to ensure proper alignment of the preforms with respect to one another. Furthermore, the preform charge can be sized and shaped to match mold features so that it is necessarily situated and remains in a single, desired position, wherein all fibers in the preform charge are ideally aligned. That is, the preform charge can be naturally "registered" in the mold and held in place therein by virtue of its shape and size. As previously noted, neither such inspection nor registration can be performed for prior-art processes. Additionally, forming a preform charge at the bending machine, or at an intermediate location between the bending machine and the mold, improves the overall efficiency of the molding process since far fewer trips are required (between the bending machine and the mold) to fill the mold.

In some embodiments, the invention provides a preform-charge fixture that forms a preform charge from a plurality of preforms, the preform-charge fixture comprising:

a central cleat, the central cleat having plural, spaced apart upright members;

a plurality of peripheral cleats, each peripheral cleat having a forward wall and being movable towards (advanced) and away (retracted) from the central cleat, wherein, when moved towards the central cleat, a gap is formed between the forward wall of each peripheral cleat and the upright members of the central cleat, wherein the gap has a size suitable for positioning and restraining the preforms received therein against the upright members; and one or more clamps physically configured to apply downward pressure to the preforms in the gap.

In some embodiments, the invention provides a preform-charge fixture that forms a preform charge from a plurality of fiber-bundle-based preforms, the preform-charge fixture comprising:

means for forming a gap that positions and restrains fiber-bundle-based preforms in the gap formed by said means; and means for applying downward pressure to the fiber-bundle-based preforms that are in the gap, wherein the preform-charge fixture is reconfigurable between at least three configurations based on a state of the means for forming the gap and a state of the means for applying downward pressure.

In some embodiments, the invention provides a preform-charge fixture that forms a preform charge from a continuous length of a resin-infused fiber bundle, the preform charge fixture comprising:

a body, wherein the body is supported for rotation about an axis normal to a major surface of the body, and wherein a minor surface of the body is aligned with the continuous length of the resin-infused fiber bundle and receives same, and wherein rotation of the body about the axis forms successive coils of the resin-infused fiber bundle on the body; and a plurality of individually actuable clamps, the clamps arranged in a row, wherein within the row, each successive clamp has a length that is longer than a preceding clamp, and wherein as successive groups of one or more coils of resin-infused fiber bundle are formed on the body, respective successive clamps in the row thereof are engaged, one at a time, with respective ones of groups of coils, each clamp thereby fixing one group of coils against the body, such that later-formed groups of coils are fixed by later-engaged clamps, the later-engaged clamps having the length that is longer than earlier-engaged clamps.

In some embodiments, the invention provides a method for forming a preform charge from fiber-bundle-based preforms, the method comprising:

placing preforms on the fixture;

constraining the preforms in a desired position;

heating the preforms until they soften, wherein the constraining and the heating is sufficient to partially consolidate the preforms but insufficient to fully consolidate the preforms;

cooling the preforms to a temperature below the point at which they soften, thereby tacking the preforms together and forming the preform charge; and removing the preform charge from the fixture.

Summarizing, the preform-charge fixture, as depicted and described, comprises: (i) means for forming a gap that positions and restrains fiber-bundle-based preforms in the gap formed by said means, and (ii) means for applying downward pressure to the fiber-bundle-based preforms that are in the gap, wherein the preform-charge fixture is reconfigurable between at least three configurations based on a state of the means for forming the gap and a state of the means for applying downward pressure. Embodiments of the preform-charge fixture may further at least one of the features, in any (non-conflicting) combination, disclosed herein and the appending drawings.

BRIEF DESCRIPTION OF THE DRAWINGS

FIG. 3A depicts, via a perspective view, further detail of a portion of the preform-charge fixture of FIG. 2B, wherein both the cleats and the clamps are disengaged.

FIG. 6A depicts, via a cross-sectional view, the preform-charge fixture of FIGS. 2A/2B, showing the cleats and clamps engaged.

FIG. 6B depicts, via a cross-sectional view, the preform-charge fixture of FIGS. 2A/2B, showing the cleats and clamps disengaged.

FIG. 9A depicts a perspective view of a second alternative embodiment of a preform fixture in accordance with the present invention.

FIG. 9B depicts an exploded view of the second alternative embodiment of a preform fixture as shown in FIG. 9A.

DETAILED DESCRIPTION

Figure 1:
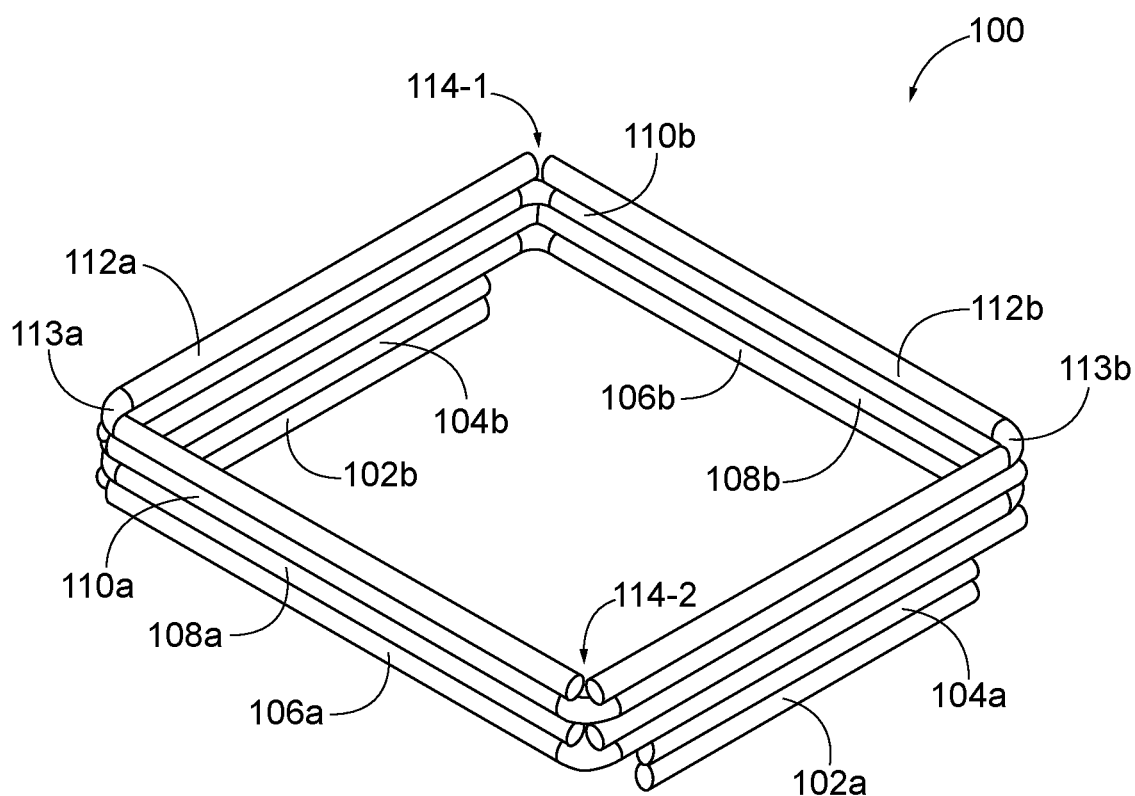
FIG. 1 depicts a perspective view of an exemplary preform charge.

Definitions. The following terms are defined for use in this description and the appended claims:

"Fiber" means an individual strand of material. A fiber has a length that is much greater than its diameter. For use herein, fibers are classified as (i) continuous or (ii) short. Continuous fibers have a length that is about equal to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold. The term "short fiber," as used herein, is distinct from the "chopped fiber" or "cut fiber," as those terms are typically used in the art. In the context of the present disclosure, continuous fiber and/or short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Tow" means a bundle of fibers (i.e., fiber bundle), and those terms are used interchangeably herein unless otherwise specified. Tows are typically available with fibers numbering in the thousands: a 1K tow, 4K tow, 8K tow, etc.

"Prepreg" means fibers that are impregnated with resin.

"Towpreg" means a fiber bundle (i.e., a tow) that is impregnated with resin.

"Preform" means a sized, or sized and shaped fiber bundle (e.g., towpreg, the output from a pultrusion line, etc.) wherein the cross section of the fiber bundle has an aspect ratio (width:thickness) of between about 0.25 to about 6. The term "preform" explicitly excludes sized/shaped (i) tape (which typically has an aspect ratio—cross section, as above—of between about 10 to about 30), (ii) sheets of fiber, and (iii) laminates.

"Consolidation" means, in the molding/forming arts, that in a grouping of fibers/resin, void space is removed to the extent possible and as acceptable for a final part. This usually requires significantly elevated pressure, either through the use of gas pressurization, (or vacuum), or the mechanical application of force (e.g., rollers, etc.), and elevated temperature (to soften/melt the resin).

"Partial consolidation" means, in the molding/forming arts, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Preform Charge" means an assemblage of preforms that are at least loosely bound together ("tacked") so as to maintain their position relative to one another. Preform charges can contain fiber in form factors in addition to fiber bundles, and can contain various inserts, passive or active. As compared to a final part, in which fibers/resin are fully consolidated, in a preform charge, the preforms are only partially consolidated (lacking sufficient pressure and possibly even sufficient temperature for full consolidation). By way of example, whereas a compression-molding process is typically conducted at about 1000 psi (which will typically be the destination for a preform-charge in accordance with the present teachings), the downward pressure applied to the preforms to create a preform charge in accordance with the present teachings is typically in the range of about 10 psi to about 100 psi. Thus, voids remain in a preform charge, and, as such, the preform charge cannot be used as a finished part.

"About" or "Substantially" means +/−20% with respect to a stated figure or nominal value.

Unless otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

FIG. 1 depicts preform charge 100. This particular preform charge can be used for making, for example, the rib portion of "rib-and-sheet" parts. An example of such a rib-and-sheet part is a protective case for smart phone.

Preform charge 100 is an assemblage of constituents which, in this embodiment, are plural preforms that have been tacked together. As a unitary structure, the plural preforms composing the preform charge can be transferred, en masse, to a mold cavity. Because the preforms in preform charge 100 are tacked together, they will not move relative to one another during the transfer process.

The preforms in preform charge 100 are sized segments of longer, essentially continuous fiber bundles, such as a spool of towpreg or the output from a pultrusion line. These segments are appropriately sized, and, for most of the preforms in charge 100, shaped (bent) as well, as suits a specific application. In particular, preforms 106A, 106B, 108A, 108B, 110A, 110B, 112A, and 112B all include one ninety-degree bend. The fiber bundles from which the preforms are sourced, and the preforms resulting therefrom, include thousands of individual fibers, typically in multiples of one thousand (e.g., 1 k, 10 k, 24 k, etc.). Although the preforms depicted in FIG. 1 are cylindrical (i.e., have a circular cross section), they can have any suitable cross-sectional shape (e.g., oval, trilobal, polygonal, etc.).

The individual fibers in the fiber bundles can have any diameter, which is typically, but not necessarily, in a range of 1 to 100 microns. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of composition, each individual fiber can be, for example and without limitation, carbon, glass, natural fibers, aramid, boron, metal, ceramic, polymer filaments, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

Any resin—thermoplastic or thermoset—that bonds to itself under heat and/or pressure can be used in the fiber bundles. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC). An exemplary thermoset is epoxy.

It is notable that in embodiments in which the resin used is a thermoplastic, the preforms are tacked together by abutting them to one another (under minimal pressure) and heating them until they soften, followed by cooling. The temperature to which the bundles are heated is a function of the resin being used; it is within the capabilities of those skilled in the art to select a temperature for tacking as a function of resin type. Pre-cured thermosets, on the other hand, are tacky without heating. Thus, in embodiments in which the resin is a thermoset, fiber bundles can be pressed together with enough force to cause them to stick to one another, without heating.

Preform charge 100 comprises a plurality of preforms, all of which comprise an identical composition (i.e., the same fiber type and resin type). However, in some other embodiments, a single preform charge can comprise preforms that have fibers and/or resins that differ from preform-to-preform. It is preferable to have the resin be the same for all preforms in a preform charge, but this is not necessary as long as the different resins are "compatible;" that is, as long as they bond to one another. A preform charge can also include inserts that are not fiber based.

Preform charge 100 has a quadrilateral configuration and includes, beginning at the bottom of the structure, straight preforms 102A and 102B, on top of which is located respective straight preforms 104A and 104B. Stacked straight preforms 102A/104A and 102B/104B are parallel to one another and positioned at opposite sides of the preform charge.

Above the straight preforms, each layer of the preform charge consists of two bent preforms. Each bent preform includes a ninety-degree bend such that the two preforms can be arranged to form a loop. Thus, the first layer of bent preforms includes preforms 106A and 106B. The next layer includes preforms 108A and 108B, which is followed by a third layer that includes preforms 110A and 110B. The top layer includes preforms 112A and 112B. The ninety-degree bends are identified for the top layer: preform 112A has a single, ninety-degree bend 113A, and preform 112B has a single, ninety-degree bend 113B.

Within each layer of bent preforms, there will be two gaps, which are located where the two ends of one of the preforms meet the two ends of the other preform. For example, referring again to the uppermost layer of preform charge 100, gaps 114-1 and 114-2 are formed where the ends of these preforms 112A and 112B meet one another.

In the illustrative embodiment, the preforms are assembled such that, in successive layers, the location of the bends (and gaps) alternate. This prevents all the gaps from aligning, which is likely to compromise the structural integrity of preform charge 100.

There are several ways to fabricate a preform charge, such as preform charge 100. Published Patent Application US2020/0114596 depicts (see, e.g., FIGS. 11, 13, 16, 18, and 21) the use of an appropriately shaped cavity, clamps, and an energy source as a tool for creating a preform charge. The shape of the cavity situates the constituents (e.g., performs, etc.) in the desired orientation. Preforms are placed in the cavity by hand or via a robot. Clamps are used, as necessary, to stabilize the constituents prior to tacking. An energy source is then used to join the thermoplastic-based preforms to one another. In such embodiments, the preform-charge fixture is somewhat analogous to a "mold."

In accordance with the illustrative embodiment, a cavity is not used to situate the preforms. Rather, in accordance with the illustrative embodiment, precisely positioned upright "cleats" serve as a guide for placement of the preforms.

Figure 2A:
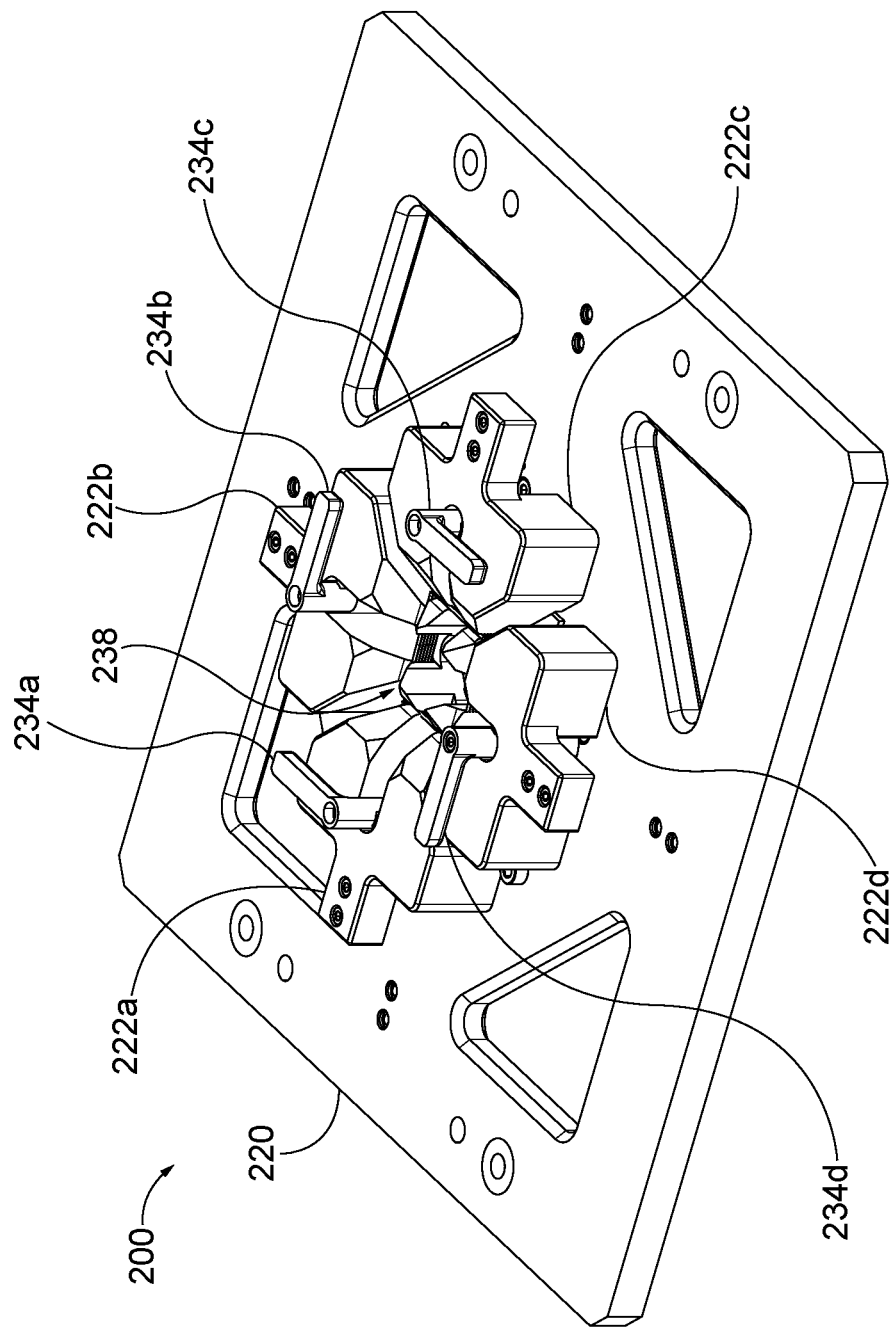
FIG. 2A depicts an embodiment of a preform-charge fixture in accordance with the illustrative embodiment of the present invention, wherein cleats are engaged and clamps are disengaged.
Figure 2B:
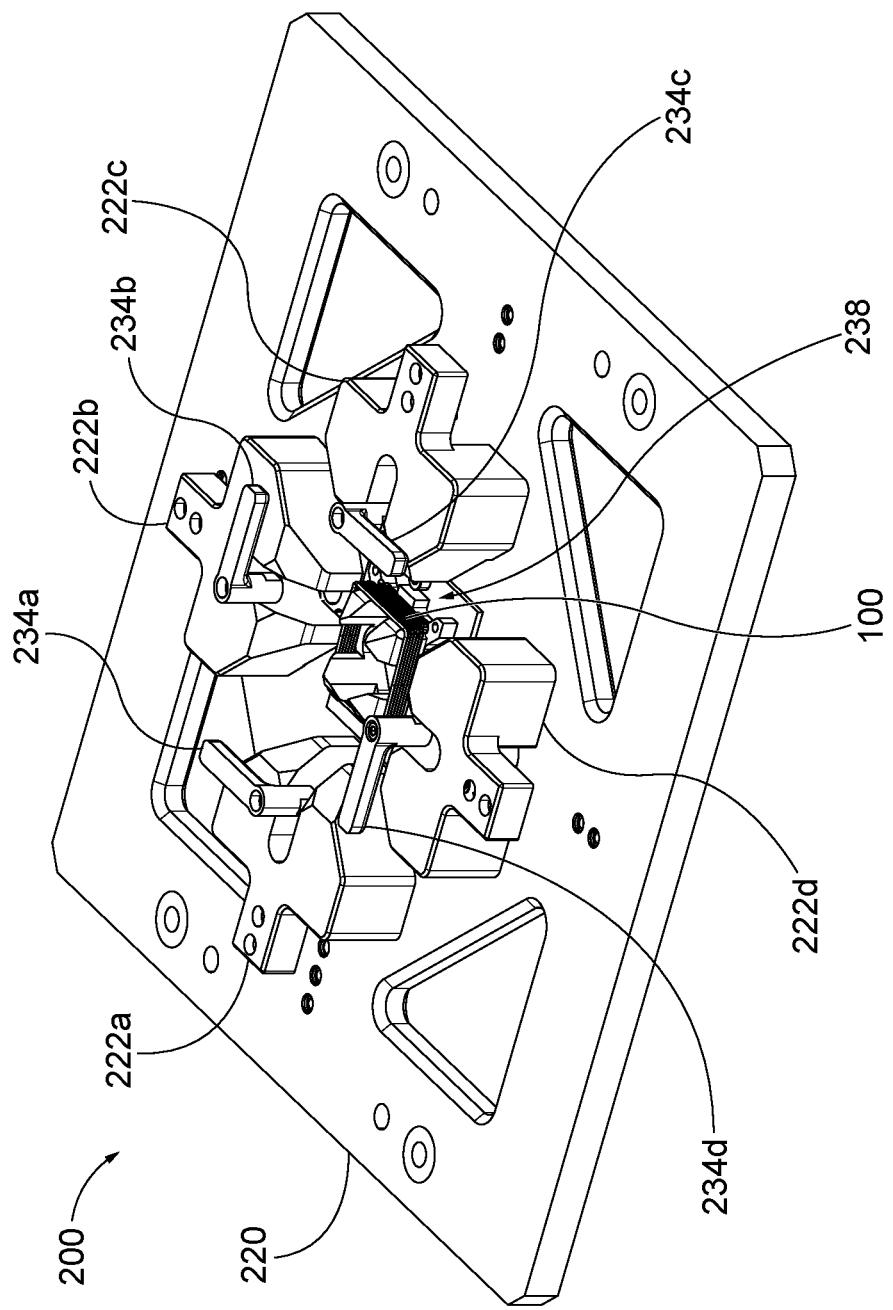
FIG. 2B depicts the perform-charge fixture of FIG. 2A, and with a preform charge disposed thereon, wherein both the cleats and the clamps are disengaged.

FIGS. 2A and 2B depict preform-charge fixture 200 in accordance with the present teachings. The salient features depicted in these figures include plate 220, four peripheral cleats 222A, 222B, 222C, and 222D (hereinafter collectively "peripheral cleats 222"), central cleat 238, and four clamps 234A, 234B, 234C, and 234D (hereinafter collectively "clamps 234"). FIG. 2B additionally depicts fully formed preform charge 100 around central cleat 238.

Preform-charge fixture 200 is physically adapted to adopt any one of several states, wherein the state of the fixture is a function of the particular operation being performed. Such operations include: (i) loading preforms onto the fixture, (ii) tacking the constituents, and (iii) unloading the preform charge. To adopt the various states, the configuration of preform-charge fixture 200 is altered. The physical adaptations that facilitate such reconfigurability include, among any others, imparting one or more degrees of freedom of motion to peripheral cleats 222 and clamps 234.

FIG. 2A depicts preform-charge fixture 200 in a state in which peripheral cleats 222 are advanced toward the central cleat 238, and clamps 234 are rotated away from the central cleat. As discussed in further detail below, this state facilitates the addition of preforms to preform-charge fixture 200. FIG. 2B depicts preform-charge fixture 200 in a state in which peripheral cleats 222 are retracted, and clamps 234 are rotated away from the central cleat. This state facilitates removal of the completed preform charge from preform-charge fixture 200. FIGS. 3A, 3B, 3C, 4A, 4B, 5A, 5B, 6A, and 6B depict the features shown in FIGS. 2A/2B in greater detail.

FIG. 3A depicts of a perspective view of a portion of preform-charge fixture 200. More particularly, this Figure depicts two peripheral cleats 222A and 222B and their associated clamps 234A and 234B, as well as central cleat 238. In this Figure, the peripheral cleats are retracted (they are at their distal-most location with respect to the central cleat), and the clamps are rotated away from the central cleat.

Peripheral cleats 222, using cleat 222A as an exemplar, have an arrowhead-like shape. Each peripheral cleat includes upper surface 324, slot 332, and forward-most upright walls 330 formed on either side of slot 332. Between upper surface 324 and upright walls 330 are two downward sloping walls 326 and 328 on each side of slot 332.

In the illustrative embodiment, each peripheral cleat has one degree of freedom of movement that enables it to move in rectilinear motion, towards or away from central cleat 238. Slot 332 in each peripheral cleat receives a clamp, such as clamp 234. As discussed further in conjunction with FIGS. 4A and 4B, although clamps 234 are rotatable, they are in a fixed position on plate 220. Consequently, slot 332 must be long enough to provide the requisite amount of movement for the peripheral cleat, towards or away from central cleat 238. (Compare FIGS. 3B and 3C.)

Each clamp includes arm 336, which is rotatable to a position that enables it to engage (apply downward pressure to) an uppermost layer of the preforms that have been placed against central cleat 238. (See, e.g., FIG. 4A.) Based on the position of arm 336 of the clamps depicted in FIG. 3A, the clamps must be capable of rotating a minimum of ninety degrees. In some other embodiments, arm 336 rotates more than, or less than, ninety degrees. It is desirable for the clamps to be controllable to act both in unison as well as independently, since the sequence of activating the clamps may assist with placing the preforms by ensuring that each is fully seated and ultimately rests in the proper location.

With continuing reference to FIG. 3A, central cleat 238 is disposed on plate 350. The central cleat includes base portion 340 and four spaced-apart upright members 342-*i* (for clarity of illustration, the upper portion of only one of upright members is depicted in FIG. 3A). The upright members serve as a guide and support for proper placement of the preforms that collectively form preform charge 100. In the illustrative embodiment, region 343 of each upright member 342-*i* is vertically oriented and provides a surface against which the preforms are positioned. Above region 343, each upright member has tapered sloping walls 346 and 344.

Figure 3B:
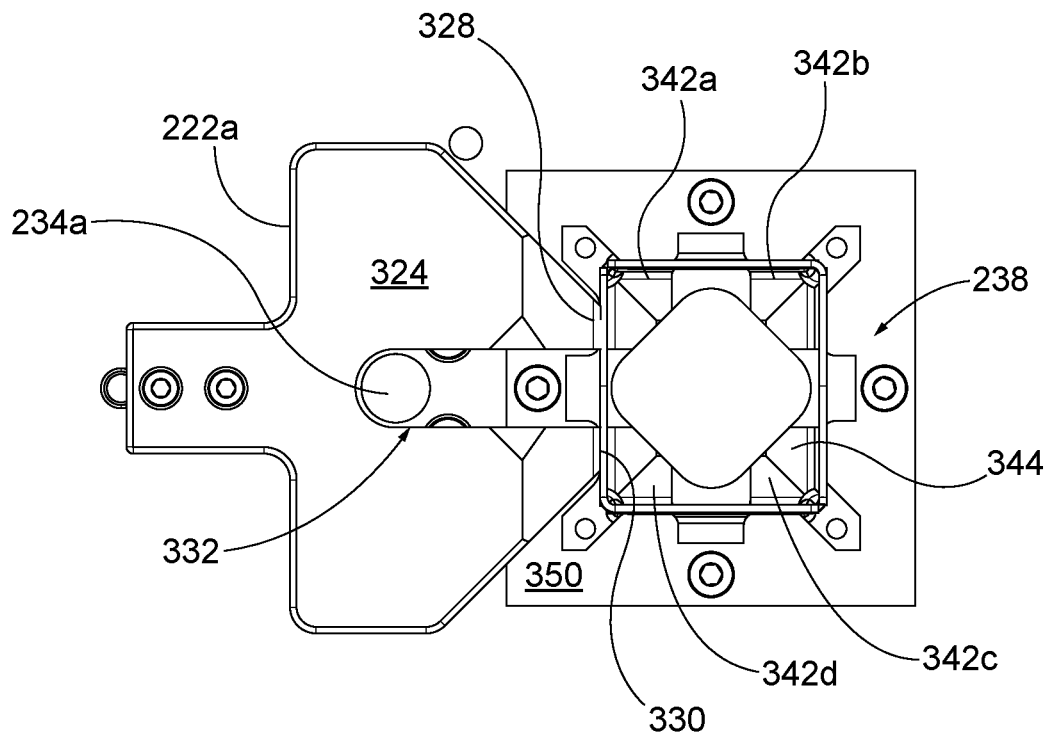
FIG. 3B depicts, via a plan view, further detail of a portion of the preform-charge fixture as shown in FIG. 2A, wherein a cleat is engaged.
Figure 3C:
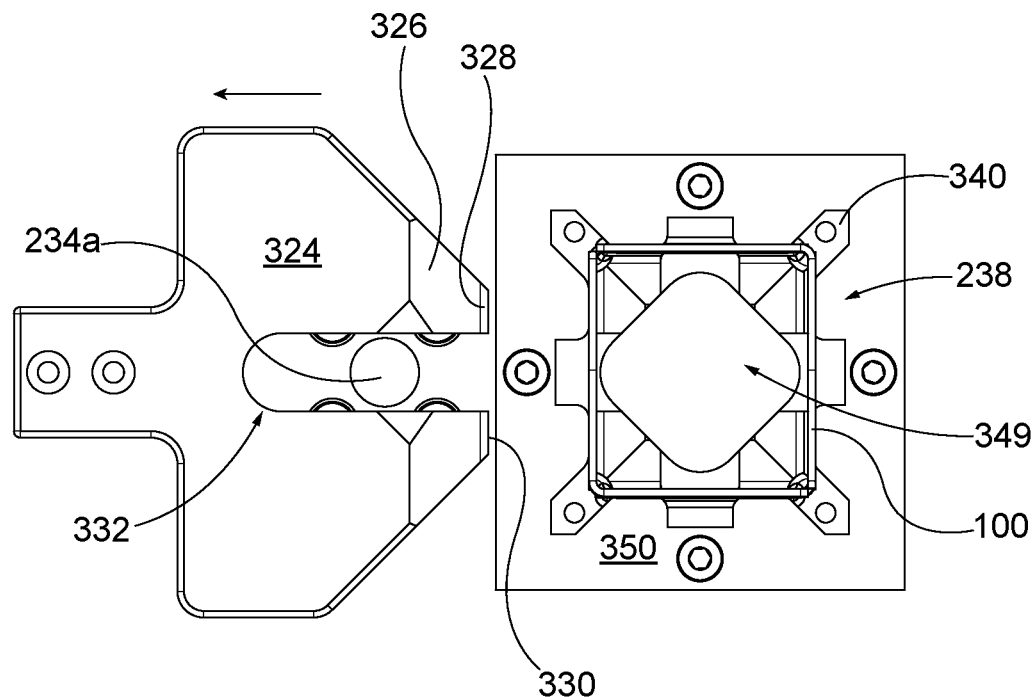
FIG. 3C depicts, via a plan view, further detail of a portion of the preform-charge fixture as shown in FIG. 2B, wherein a cleat is disengaged.

Turning now to FIGS. 3B and 3C, peripheral cleat 222A is depicted along with central cleat 238. The four upright members 342-*i* of central cleat 238 are now individually identified as 342A, 342B, 342C, and 342D.

FIG. 3B depicts peripheral cleat 222A in its advanced position, such that its front walls 330 nearly abut wall 343 of each upright member of central cleat 238. This creates the desired geometry to constrain the preforms against the central cleat during preform placement operations. More particularly, this near-abutting relationship creates a very small gap in which the preforms reside. Although this narrow gap serves to maintain the performs in their desired placement positions, it is potentially problematic for actually getting the preforms into the gap. To facilitate this, and as discussed further in conjunction with FIG. 5A, sloping walls 326 and 328 of the peripheral cleats 222, and sloping walls 346 and 344 of upright members 342-*i* create a relatively wider (than the gap) preform-receiving region.

As depicted in FIG. 3B, the forward travel of peripheral cleat 222A causes slot 332 to move to a position in which its closed end abuts the vertical and stationary portion of clamp 234A.

FIG. 3C depicts peripheral cleat 222A in its fully retracted position. The top view afforded by FIGS. 3B and 3C reveals opening 349 in central cleat 238. This opening occupies most of the area defined within the perimeter demarcated by the upright members of the central cleat. As described more fully in conjunction with FIG. 7, opening 349 accommodates an energy source for raising the temperature of the preforms so that they can be tacked to one another to form the preform charge.

Figure 4A:
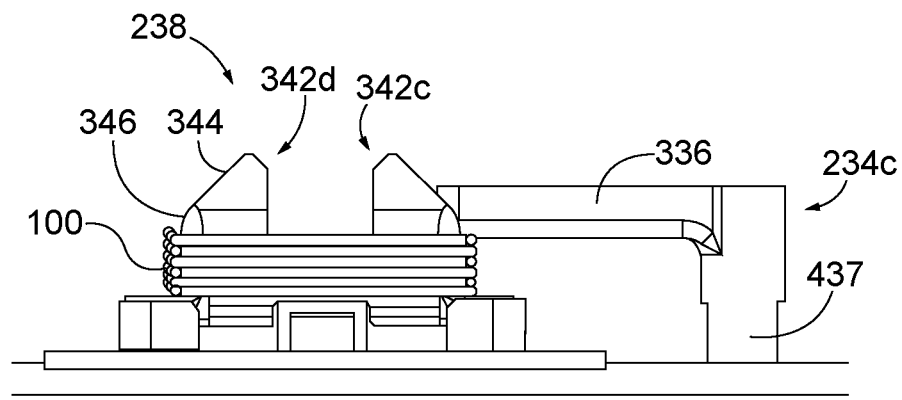
FIG. 4A depicts a side view of a central cleat and clamp of the preform-charge fixture of FIGS. 2A/2B, wherein the clamp engages the preform charge.
Figure 4B:
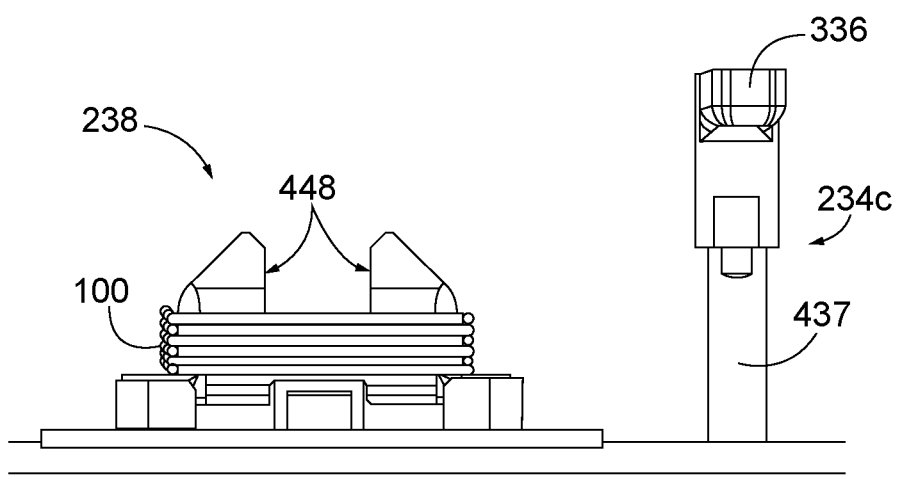
FIG. 4B depicts a side view of a central cleat and clamp of the preform-charge fixture of FIGS. 2A/2B, wherein the clamp is disengaged from the preform charge.

FIGS. 4A and 4B depict the operation of clamps 234, as exemplified by clamp 234C. The clamp includes upright member 437 and arm 336, the latter being horizontally oriented. As will be appreciated from these Figures, clamps 234 possess two degrees of freedom of movement. Specifically, upright member 437 is capable of linear movement in a vertical direction and rotational movement in a horizontal direction.

In FIG. 4A, upright member 437 and arm 336 of clamp 234C is fully rotated towards central cleat 238, such the arm overlies and contacts a portion of a preform in the uppermost layer of preform charge 100. In this position, upright member 437 and arm 336 are at a relatively reduced height. The sloping orientation of walls 346 and 344 of the upper portion of upright member 342D are clearly seen in these Figures.

In FIG. 4B, arm 336 of clamp 234C is fully rotated away from central cleat 238. Here, upright member 437 and arm 336 are at a relatively increased height.

As mentioned above in conjunction with FIG. 3C, opening 349 in central cleat 238 accommodates an energy source for heating the preforms. The spacing provided between inner surface 448 of adjacent upright members facilitates the transfer of energy from the energy source to the performs. Additionally, it provides a region at which arm 336 of each clamp can engage the preforms that are positioned against central cleat 238.

Figure 5A:
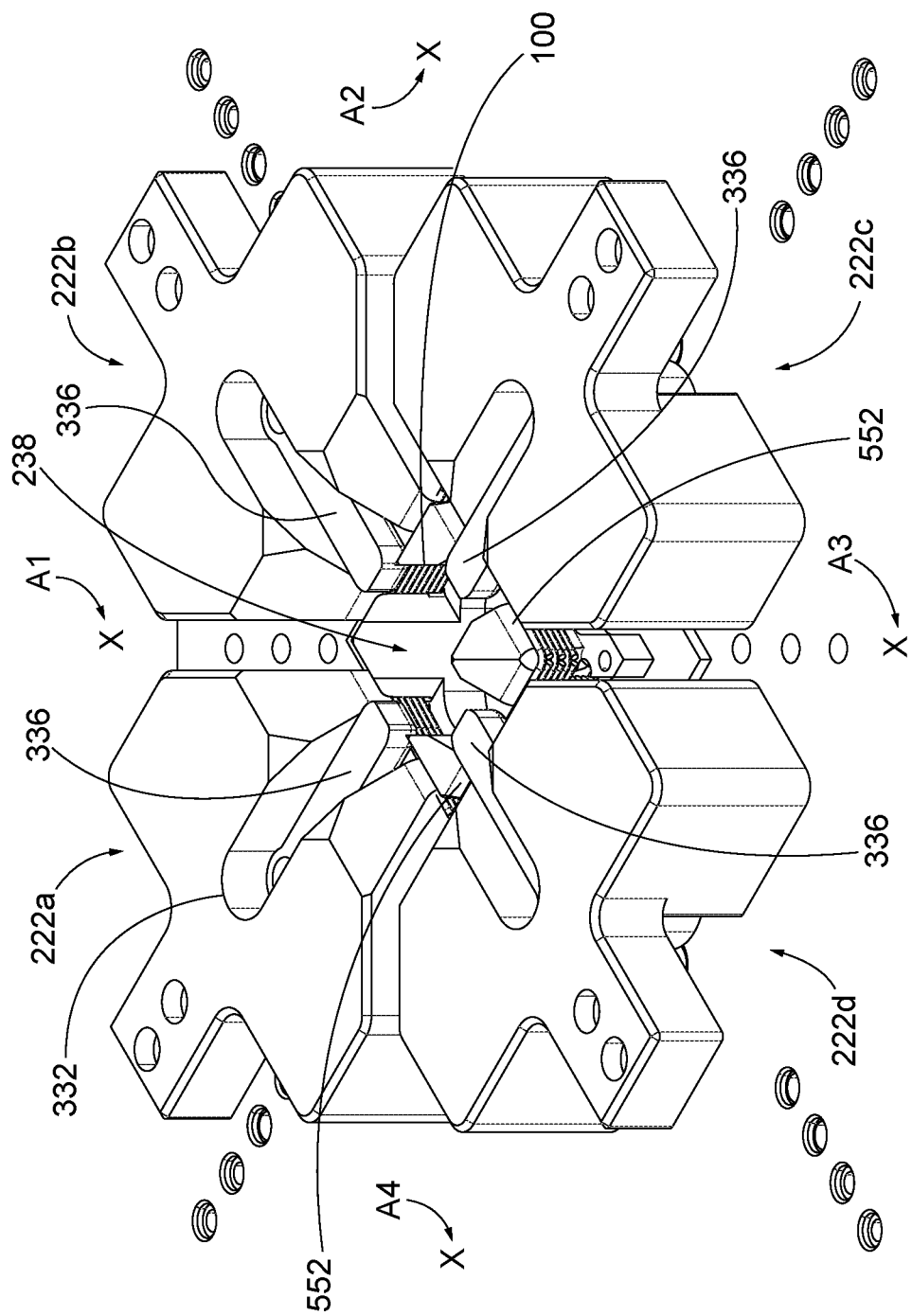
FIG. 5A depicts, via a perspective view, the preform-charge fixture of FIGS. 2A/2B, showing all cleats and clamps engaged.

FIG. 5A depicts preform-charge fixture 200 in a state in which arms 336 of all clamps are rotated towards central cleat 238, and all peripheral cleats 222 are fully advanced. Arms 336 overlie the uppermost layer of preforms in the preform charge. Preform-receiving region 552, as previously mentioned, is formed between the sloping walls of the peripheral cleats and the sloping walls of the upright members of central cleat 238. The preform-receiving region facilitates placement of preforms in the gap formed between front wall 330 of the peripheral cleats 222 and region 343 of upright members of the central cleat.

Figure 5B:
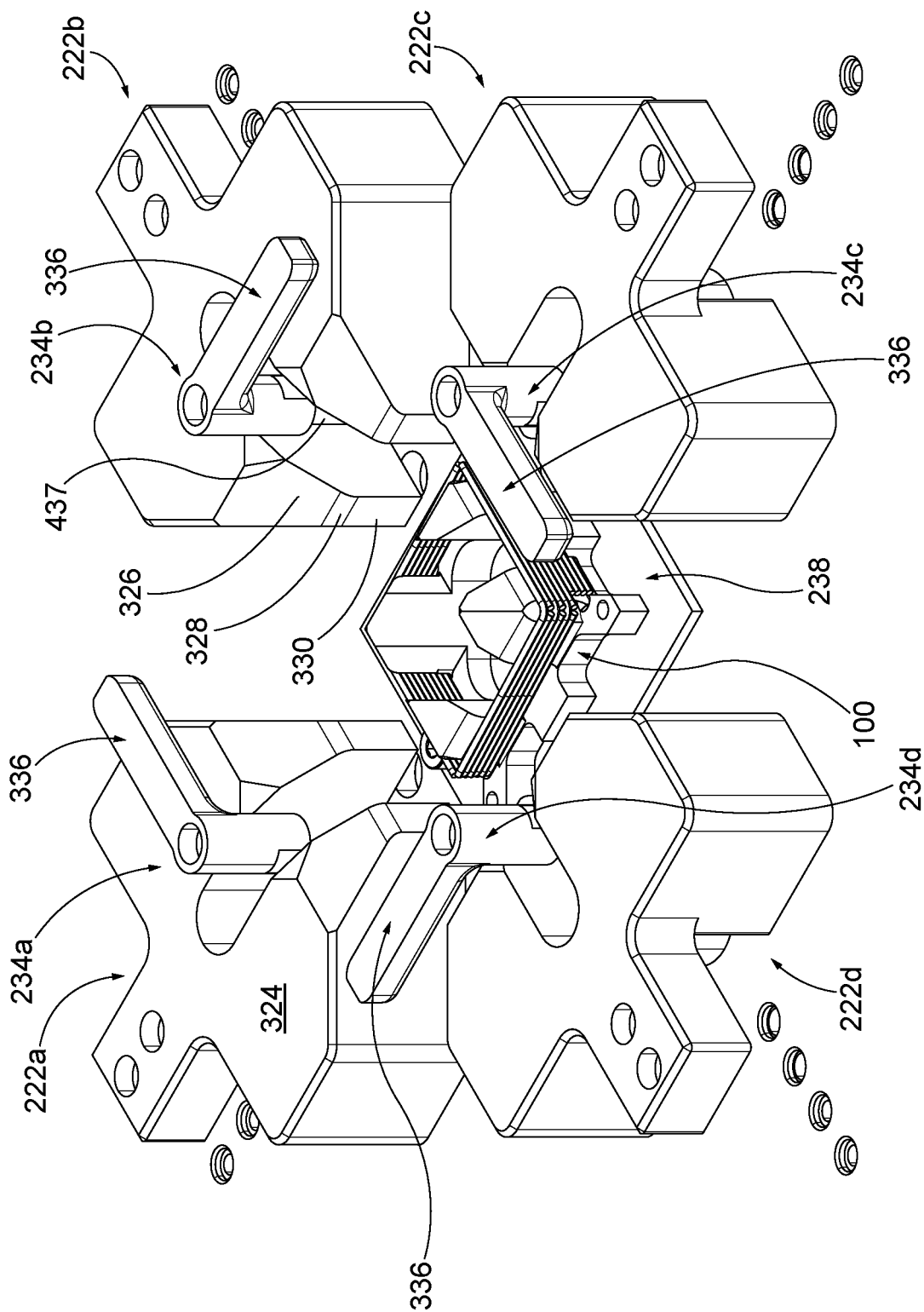
FIG. 5B depicts, via a perspective view, the preform-charge fixture of FIGS. 2A/2B, showing all cleats and clamps disengaged.

FIG. 5B depicts preform-charge fixture 200 in a state in which arms 336 of all clamps are rotated away from cleat 238, and all peripheral cleats 222 are fully retracted. Comparing FIG. 5A to FIG. 5B, note that when a clamp rotates towards the central cleat, it drops in height to engage the preforms. Conversely, when the clamp rotates away from the central cleat, it is raised to clear upper surface 324 of the peripheral cleat.

In the illustrative embodiment, peripheral cleats 222 translate via a pneumatic force, wherein the pneumatic force provides both an actuation function as well as imparting "compliance" to the behavior of the peripheral cleats. In some other embodiments, translation is effected via mechanical, electrical, hydraulic, and/or magnetic means/forces.

In the illustrative embodiment, clamps 234 are able to rotate and move vertically by means of pneumatic force. The ability to swivel facilitates moving the clamps out of the way to load constituents or unload a finalized preform charge. In some other embodiments, rotation of the clamps is effected via a rotary actuator.

In some embodiments, the pneumatic lines (not depicted), or other actuation devices, are located below plate 220 (FIGS. 2A/2B).

FIGS. 6A and 6B depict cross-sectional views through slots 332 of peripheral cleats 222A and 222C in respective FIGS. 5A and 5B. FIG. 6A depicts arm 336 of the three depicted clamps (234A, 234B, and 234C) positioned on top of the uppermost layer of preforms in preform charge 100. FIG. 6B depicts arm 336 of the three depicted clamps rotated away from the central cleat.

Figure 7:
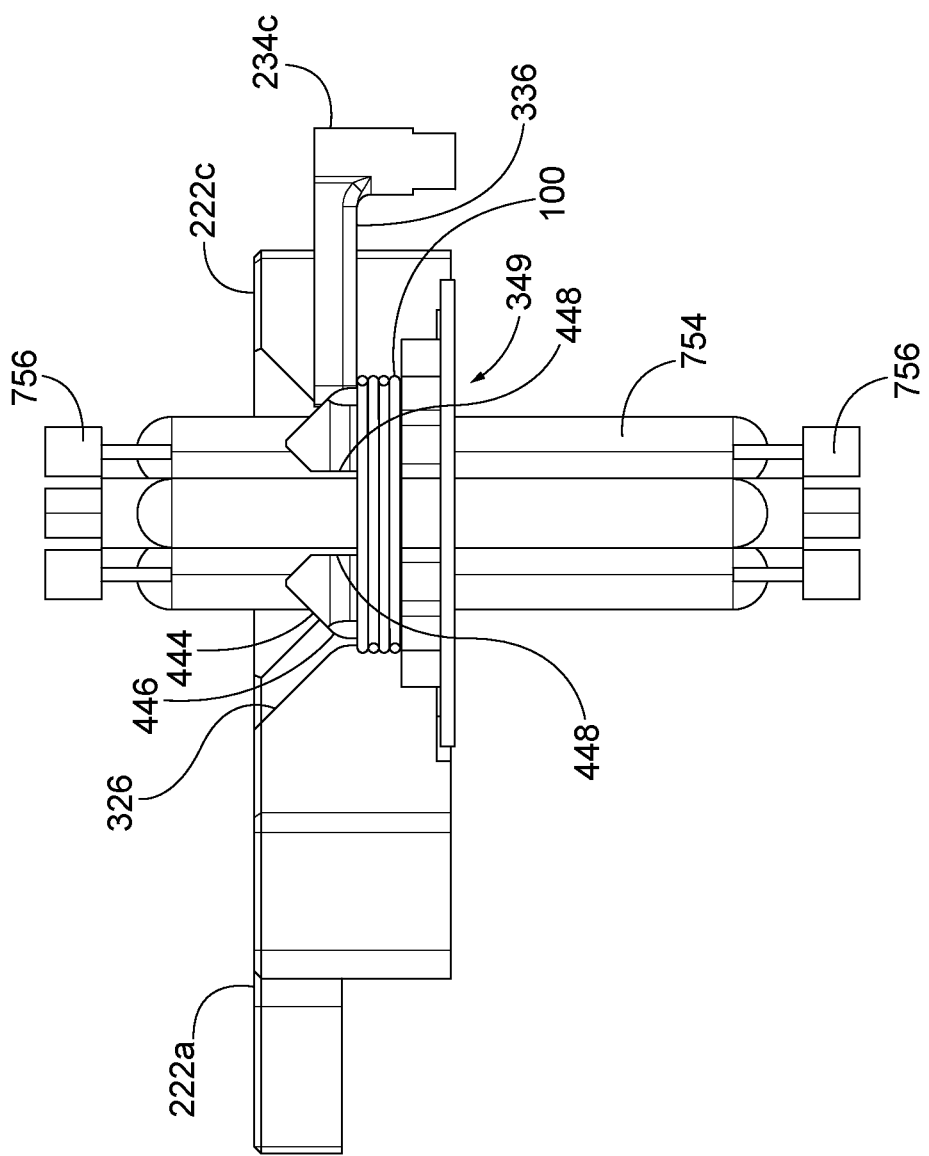
FIG. 7 depicts an energy source in use with the preform-charge fixture of FIGS. 2A/2B.

FIG. 7 depicts an energy source being used in conjunction with preform-charge fixture 200 to soften the preforms in preparation for tacking. In the illustrative embodiment, the energy source is a plurality of lights 754 that emit infrared energy ("IR"). Electrical contacts 756 electrically couple to an appropriate source of electricity to power the lights. In some embodiments, fixture 200 is configured so that only a portion of the preforms in the nascent preform charge are controllably exposed to energy at any one time. As previously noted, inner surfaces 448 of adjacent upright members of the central cleat provide windows through which (light) energy passes to reach the preforms. In some other embodiments, tacking is accomplished via other means of heating, such as microwave generators, diode lasers, light bulbs, ultrasound transmitters, conduction by means of heated fluid or electric heat, convection, heated air, or combinations thereof.

In the illustrative embodiment depicted in FIG. 7, the energy source is movable so as not to interfere with the ability of material-handling components to load preforms or unload the finalized preform charge. To that end, in various embodiments, the energy source is movable via translational and/or rotational movement. In some other embodiments, the energy source is manually removed from opening 349 of central cleat 238 to an appropriate location to facilitate loading or unloading operations.

Preform charge 100 can be assembled via preform-charge fixture 200 in the following manner. The assembly sequence begins by fully advancing cleats 222 towards central cleat 238. Clamps 234 are in their non-engaged position. See, e.g., FIGS. 2A, 3B.

With reference to preform charge 100 (FIG. 1), straight preform 102A is ultimately positioned in the gap between the appropriate peripheral cleat and two opposing upright members 342-*i* of central cleat 238. This is accomplished either manually or via a pick-and-place robot. To place a preform via a pick-and-place robot (not depicted), the end effector of the robot grasps the preform and moves into slot 332 of an appropriate peripheral cleat. The preform is then positioned in (or directly above) preform-receiving region 552 (see FIG. 5A for region 552). The end effector then releases the preform, such that it is channeled into gap and abuts wall 343 of two of the upright members of central cleat 238.

After placement of straight preform 102A, straight preform 102B is positioned, in the manner discussed above, on the side of central cleat 235 opposite to where preform 102A is placed.

At this point, the associated clamps 234 (e.g., clamps 234A and 234C, etc.) may be actuated, thereby rotating arm 336 of each such clamp towards central cleat 238, engaging and applying a small amount of downward pressure to the preforms to ensure that the preforms are in their proper location and properly seated. The clamps are then raised and rotated away from central cleat 235 to a non-engaged position.

In the next two operations, straight preform 104*a* is placed on top of preform 102*a*, and preform 104B is placed on top of preform 102B. Alternatively, the first two operations can involve stacking two preforms—for example preforms 102A and 102B-followed by the stacking of preforms 102B and 104B.

The same clamps that were previously actuated are then actuated again to engage and apply downward pressure to preforms 104A and 104B. It is notable that, in the illustrative embodiment using pneumatic actuation, one or more of clamps 234 can be cycled (i.e., engage the preforms and then rotate away) in less time than it takes for the next preform to be placed. Consequently, actuating a clamp after each preform placement is a preferred approach; proper seating of each preform is assured with no process-efficiency penalty. If, however, clamp actuation were to take longer than a preform placement, it would be desirable to actuate the clamps no more than necessary to properly seat the growing stack of preforms.

The assembly continues with the placement of the bent preforms. If one or more of the clamps have been rotated into contact with the preforms, such clamps must be rotated away in a non-engaged position before the placement of additional preforms.

Preform 106A is positioned in the manner discussed above. The appropriate clamps (which will be adjacent clamps as a consequence of the single bend in the preform) are then rotated into position so that arm 336 of each of the two clamps applies a small amount of downward pressure to preform 106A. Preform 106B is then placed to complete the first loop-layer of the nascent preform charge. The appropriate two clamps are then rotated into position so that arm 336 of clamp applies a small amount of downward pressure to preform 106B.

The clamps are then rotated to a non-engaged position, and the next loop-layer is created by placing preforms 108A and 108B in fixture 200. In this loop layer, the locations of the bend in the preforms 108A and 108B overlie the gaps between the preforms 106A and 106B of the underlying layer. This prevents the gaps in each layer from aligning with the gaps in all other layers.

The process is repeated, loop-layer by loop-layer, until all preforms have been placed, ensuring that the bends in the preforms in a given loop-layer align with the gaps between the preforms in adjacent underlying/overlying loop-layers.

With all clamps engaged to the uppermost layer of preforms, the energy source is moved into position and the preforms are heated until they soften. The temperature at which the preforms will soften is a function of the particular thermoplastic resin used. It is within the capabilities of those skilled in the art to determine the temperature at which any given thermoplastic resin will soften. Typically, this temperature is greater than or equal to the heat deflection temperature of the particular thermoplastic. For example, for PA6 (nylon 6), the heat deflection temperature is about 320° F., and this is the temperature at which a PA6-based preform will soften.

Although the clamps are engaged, the force they apply to (thermoplastic-based) preforms is relatively minimal; the primary purpose of the clamps is to ensure proper alignment and seating. Gravity provides at least as much or not more downward force on the preforms. In any case, the combination of the clamping force and gravity ensures that each preform abuts an underlying preform so that partial consolidation can occur. After heat is removed and the preforms cool to below their heat deflection temperature, tacking is complete, resulting in a partially consolidated assemblage of preforms defining preform charge 100.

Next, the energy source is then removed, clamps 234 are rotated to the non-engaged position, and cleats 222 are retracted. Preform charge 100 is then removed from central cleat 238 either manually or by the end effector of a pick-and-place robot.

In summary, the fabrication process for use with fixture 200 involves:
  (i) advancing peripheral cleats 222 towards central cleat 238;
  (ii) forming a layer of the preform charge by placing preforms into the gap formed between the peripheral cleats and the central cleat;
  (iii) optionally rotating clamps into engagement with preforms in the just-formed layer;
  (iv) rotating clamps to a non-engagement position as necessary;
  (v) repeating operations (ii)-(iv) to form all subsequent layers of the preform charge;
  (vi) with cleats advanced and clamps remaining in engagement with the uppermost layer of the nascent preform charge, tack the preforms to one another by the application of heat and its subsequent removal;

(vii) retracting the cleats and rotating the clamps out of engagement with the preform charge; and (viii) removing the completed preform charge from the preform-charge fixture.

More generally, in accordance with the present teachings, the fabrication process for a preform charge involves the operations of (a) positioning the preforms, (b) ensuring that they maintain their position, and (c) tacking them together. The particular manner in which operations (a) through (c) are accomplished is a function of the configuration of the preform-charge fixture. For example, as described further below, the detailed fabrication steps for forming a preform charge using the alternative embodiments of a preform-charge fixture depicted in FIGS. 8 and 9A/9B will differ from those required when using fixture 200 to accomplish operations (a) through (c).

As previously mentioned, fixture 200 reconfigures to a number of different states as a function of the fabrication operation being performed. Such states include:

cleats retracted/clamps not engaged (removal of completed preform charge);

cleats advanced/clamps not engaged (preform loading);

cleats advanced/clamps engaged (intermediate alignment operations; tacking).

In light of the foregoing, it will be appreciated that the ability of peripheral cleats 222 to translate relative to central cleat 238 is desirable for several reasons. First, in their advanced position, the peripheral cleats assist in positioning the preforms against the central cleat. Second, in the advanced position, the peripheral cleats constrain the preforms until the application of a greater force, such as a clamping force, so that additional constituents may be added to the nascent preform charge in a controlled manner. And third, the peripheral cleats, in their retracted position, enable the finalized preform charge to be removed by facilitating access thereto by other material-handling components (not depicted).

It is within the capabilities of those skilled in the art, in light of the present disclosure, to make and use preform fixtures having the same basic components as fixture 200, but having a different number of any one or more of peripheral cleats 222, central cleat 238, and clamps 234, as is appropriate for the particular preform charge being fabricated.

Furthermore, it is within the capabilities of those skilled in the art, in light of the present disclosure, to arrange peripheral cleats 222 in a different manner than depicted in FIGS. 2A/2B, etc., and/or with a capability to move in a manner other than as described above, to facilitate fabrication of a preform charge having favorable fiber alignment and effective geometry for the production of any fiber-composite part. For example, in some alternative embodiments, peripheral cleats 234 (i.e., upright member 447 thereof) are located such that they are not in the path of movement of peripheral cleats 222. For example, the clamps can be located at positions A1, A2, A3, and A4 as depicted in FIG. 5A. If so located, the arm (i.e., arm 336 thereof) must have a different configuration to be able to contact the preforms to apply downward pressure thereto. It is within the capabilities of those skilled in the art, in light of the present disclosure, to modify clamps 234 are required to accommodate an alternative placement with respect to peripheral cleats 222.

Moreover, in some embodiments, rather than employing plural clamps 234, a single clamp having multiple "arms" (that engage the preforms) can be used in conjunction with preform-charge fixture 200. Such a clamp may have a structure more akin to the male part of a mold. In some embodiments, such a clamp is supported by a single upright member. If positioned in the manner of upright member 437 of clamps 234, then only a single peripheral clamp need include a slot, such as slot 332. Alternatively, the upright member of such an alternative clamp can be located on the base plate (e.g., base plate 220) at a location that does not impede movement of any peripheral cleat.

Figure 8:
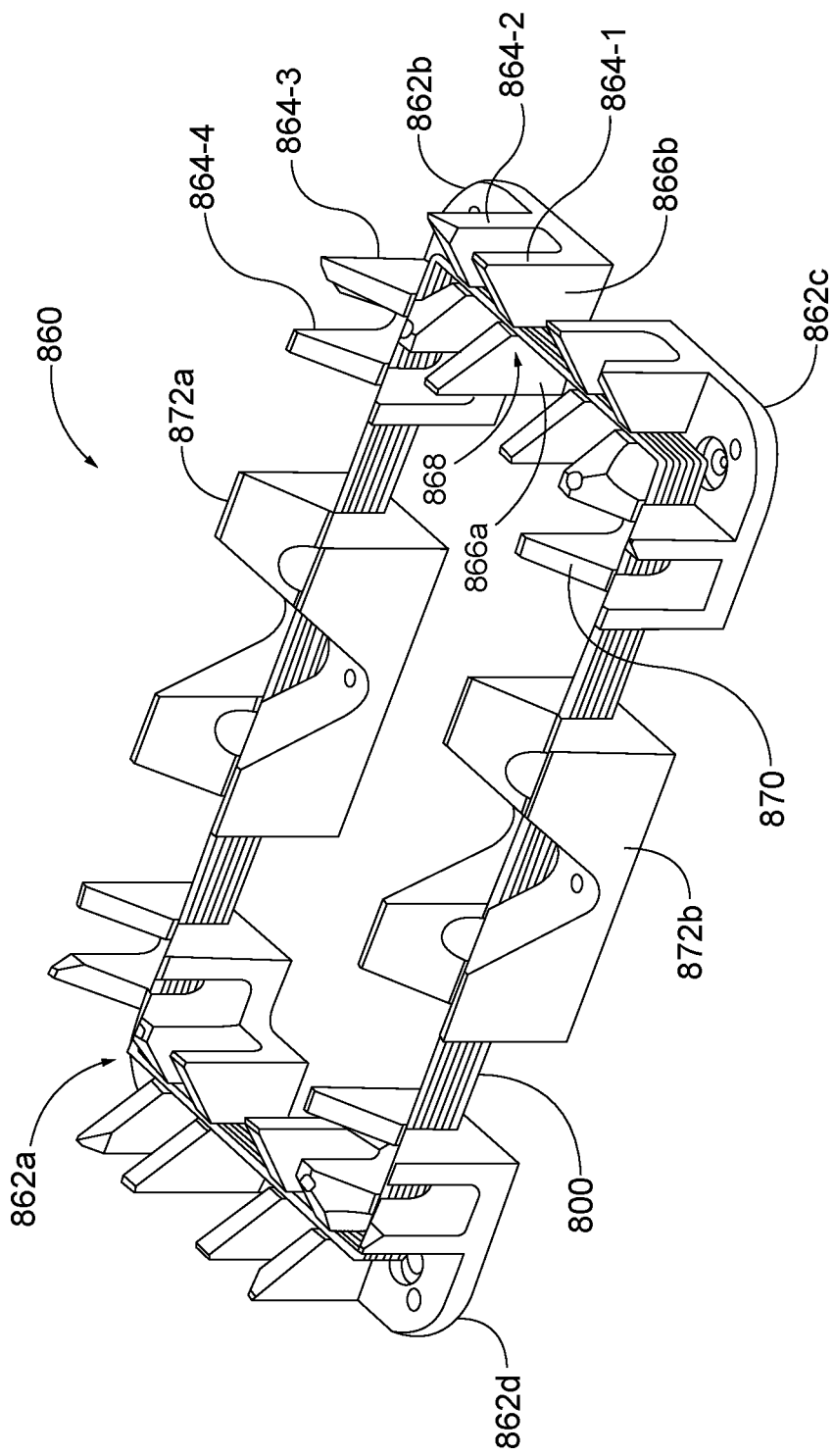
FIG. 8 depicts a perspective view of a partial assembly of a first alternative embodiment of a portion of a preform-charge fixture in accordance with the present invention.

FIG. 8 depicts the salient features of preform-charge fixture 860, which is a first alternative embodiment of fixture 200. Fixture 860 is used to create preform charge 800, which has the same basic rectangular form factor as preform charge 100. Indeed, with an appropriate alteration in aspect ratio, fixture 860 can be used to fabricate preform charge 100.

Preform-charge fixture 860 includes four corner cleats 862A, 862B, 862C, and 862D (hereinafter collectively "corner cleats 862") and two side cleats 872A and 872B (hereinafter collectively "side cleats 872"). Although not depicted in FIG. 8, fixture 860 also includes a plate, similar to plate 220 of fixture 200, on which the cleats reside. Unlike fixture 200, none of the cleats of fixture 860 are movable; that is, they are fixed in place. That positioning defines the geometry of preform charge 800.

Corner cleats 862 and side cleats 872 have features that enable gross alignment of the preforms constituents that are dropped, or placed in the vicinity of their desired assembly location. In particular, in the illustrative embodiment, each corner cleat 862 includes four upright members 864-1, 864-2, 864-3, and 864-4 (hereinafter collectively "upright members 864"). Each upright member includes two spaced mirror-image portions 866A and 886B. The space between the two portions 866A and 866B defines gap 868 in which the preforms are ultimately sited. An upper surface 870 of each of portions 866A and 866B tapers downwardly toward gap 868 creating a v-shaped preform-receiving region. This receiving region is a feature that provides gross alignment of preforms intended for gap 868. Side cleats 872 include two upright members of similar design to those of corner cleats 862, including a gap in which the preforms are ultimate sited and a v-shaped preform-receiving region.

Like fixture 200, preforms may be placed in fixture 860 either manually or via a pick-and-place tool. In the illustrative embodiment, clamps are not employed; gap 868 is relied upon for positioning and constraining the preforms, and gravity provides a downward/compressive force for seating and tacking the preforms. In some other embodiments, rotatable clamps are used to supplement the constraining capability provided by gap 868 and to provide downward force on the uppermost layer of preforms to facilitate seating and tacking operations. The clamps can be similar to clamps 234, or, alternatively, be in the form of a single clamp having multiple "arms" (that engage the preforms) can be used in conjunction with preform-charge fixture 200.

An energy source, as used for fixture 200, can be placed within the region demarcated by the cleats to soften the preforms for tacking.

Fixture 200 and fixture 860 can both be considered as having:

means for forming a gap that positions and restrains fiber-bundle-based preforms in the gap formed by said means;

means for applying downward pressure to the fiber-bundle-based preforms that are in the gap; and, optionally, means for softening the preforms.

The "means for forming the gap" is, in the case of fixture 200, each peripheral cleat 222 in combination with central cleat 238, and equivalents thereof. With respect to fixture 860, "means for forming the gap" is corner cleats 862 and side cleats 872, and equivalents thereof. The "means for applying downward pressure" is a clamp, however configured (e.g., clamps 234, single clamp having multiple arms, etc.), and equivalents thereof. The "means for softening the preforms" can a source of IR, microwave generators, diode lasers, light bulbs, ultrasound transmitters, conduction by means of heated fluid or electric heat, convection, heated air, or combinations thereof, and equivalents thereof.

FIGS. 9A and 9B depict preform-charge fixture 974, which is a second alternative embodiment of a preform-charge fixture. The preform charge created by fixture 974 has a similar four-sided configuration to preform charges 100 or 800, although based on the dimensions of the fixture, the preform charge fabricated thereby will have the shape of a square with rounded edges. Fixture 974 could be suitably altered to provide a preform charge having an aspect ratio and structure close to that of preform charge 800.

Notwithstanding its ability to create a preform charge similar to that preform 800, the configuration of preform-charge fixture 974 is quite different than that of fixtures 200 or 860. Furthermore, rather than using preforms—cut/sized segments of resin-infused fiber bundles—the fiber/resin feed used in conjunction with preform-charge fixture 974 is a continuous feed of unsized resin-infused fiber bundle.

Referring to FIGS. 9A and 9B, fixture 974 comprises three main parts: center body 992, first end piece 976, and second end piece 996. A plurality of clamps 980-*i* are rotatably coupled to one edge of first end piece 976. The clamps are individually controllable to rotate towards and away from center body 992.

Fixture 974 receives a continuous length of resin-infused fiber bundle 1000 to form a preform charge. In some embodiments, the resin-infused fiber bundle is commercially obtained towpreg. In some other embodiments, fixture 974 is used as part of, or in conjunction with, a pultrusion process that produces a resin-infused fiber bundle. Pultrusion is one of the more efficient processes for combining polymers and fibers to form useful fiber composites. It is therefore desirable to efficiently and accurately create preforms in a particular geometry within the pultrusion process, such as via preform-charge fixture 974, which can then be used in molding processes, such as compression molding.

In either case, a continuous length of resin-infused fiber bundle is wrapped around center body 992 to create a preform charge.

For the purposes of the following description, it is assumed that preform-charge fixture 974 is used in conjunction with a pultrusion line. Preform-charge fixture 974 is oriented with respect to the pultrusion line (not depicted) so that the axis of pultruded material (resin-infused fiber bundle 1000) is normal to the major face of each of end pieces 976 and 996 and normal to the axis about which fixture 974 rotates. In some embodiments, fixture 974 is free to translate such that surface 978 is directly below resin-infused fiber bundle 1000.

The pultruded material (i.e., resin-infused fiber bundle 1000) is in a continuous state of motion during the pultrusion process. Consequently, a sequence of clamps 980-*i* is used to hold the pultruded material in a desired location while preform-charge fixture 974 rotates, with the result that the pultruded material coils around the fixture. Rotation is controlled to so that it can be synchronized with the rate of material egress from the pultrusion process.

The required number of clamps 980-*i* may be mathematically correlated to the desired number of coils in the preform charge. For example, each clamp may be designed to hold a specific number of coils of fiber bundle 1000. For example, if each clamp is intended to hold 3 coils of fiber bundle, and the preform charge is to have 30 coils (i.e., layers) of the fiber bundle, then ten clamps will be required.

In the illustrative embodiment, clamps 980-*i* have features that are able to guide, secure, and sever resin-infused fiber bundle 1000. For example, high-friction surface 984 (present on the underside of each clamp) acts to securely grip the pultruded material. It is notable that the clamps have a different length, such that shorter-length clamps hold material first introduced onto fixture 974 with successively longer-length clamps stabilizing later introduced pultruded material. Edge 986, which is disposed on the longest length clamp, severs the continuous length of pultruded material 1000 from such material coiled on fixture 974. Leading edge surface 982 of each clamp is able, when the clamp is engaged, to guide the pultruded material being coiled onto fixture 974.

Continuing with the example of three coils of material per clamp, after the initial three rotations of fixture 974, the first (and shortest-length) clamp rotates towards surface 978, such that the clamp's high-friction surface engage the three coils of material, fixing them in place. As fixture 974 continues to rotate creating a fourth coil of material, leading edge surface 982 of the engaged clamp guides the material.

The fixture continues to rotate and, after every third rotation, another clamp of slightly longer length than the previously-engaged clamp rotates into place. In various embodiments, clamps 980-*i* rotate by mechanical, electrical, magnetic, hydraulic, pneumatic, or timed inertial means, based on the rotational rate of fixture 974.

In some embodiments, to obtain a stable shape for the coiled preform charge, the temperature of surface 978, or a region proximal thereto, is controlled. In the embodiment depicted in FIGS. 9A and 9B, fixture 974 includes plural through-holes 994. These through-holes allow fluid to flow through center body 992. This enables a heat exchanger (not depicted), for heating or cooling as appropriate, to control temperature and, therefore, control the process of tacking the coiled pultruded material in concert with the clamps. Cavities 988 in first end piece 976 direct such fluid into a tortuous path through center body 992. Fluid enters port 990 on first end piece 976 and ultimately exits port 998 on second end piece 996. The fluid may be liquid or gas, and may be selected to best correlate to the optimal specific heat for both the fixture and pultruded material.

It is to be understood that the disclosure describes a few embodiments and that many variations of the invention can easily be devised by those skilled in the art after reading this disclosure and that the scope of the present invention is to be determined by the following claims.

The following claims are presented for examination:

1. A preform-charge fixture that forms a preform charge from a plurality of preforms, the preform-charge fixture comprising:
 a central cleat, the central cleat having plural, spaced apart upright members;
 a plurality of peripheral cleats, each peripheral cleat having a forward wall and being movable towards (advanced) and away (retracted) from the central cleat, wherein, when moved towards the central cleat, a gap is formed between the forward wall of each peripheral cleat and the upright members of the central cleat, wherein the gap has a size suitable for positioning and restraining the preforms received therein against and abutting the upright members; and one or more clamps physically configured to apply downward pressure to the preforms in the gap, wherein the one or more clamps each comprise an upright member and an arm coupled thereto.

2. The preform-charge fixture of claim 1 wherein each clamp has two degrees of freedom of movement.

3. The preform-charge fixture of claim 2 wherein a first of the two degrees of freedom of movement of the clamp is linear movement and the second of the two degrees of freedom of movement is rotational movement.

4. The preform-charge fixture of claim 3 wherein linear movement occurs in a plane that is orthogonal to a plane in which the rotational movement occurs.

5. The preform-charge fixture of claim 1 wherein there is one clamp for each peripheral cleat, and the upright member of each clamp has a fixed location with respect to the central cleat.

6. The preform-charge fixture of claim 5 wherein the fixed location of each upright member of each clamp is in a path of movement of each one of the peripheral cleats towards and away from the central cleat, and wherein each peripheral cleat comprises a slot that is dimensioned and arranged to receive the upright member of respective ones of the clamps, the slot therefore enabling the peripheral cleat to move towards and away from the central cleat.

7. The preform-charge fixture of claim 3 wherein the preform-charge fixture has at least three configurations corresponding to at least three operational modes thereof, including:
    (a) peripheral cleats retracted from the central cleat and the arm of the at least one clamp rotated away from the central cleat;
    (b) peripheral cleats advanced towards the central cleat and the arm of the at least one clamp rotated away from the central cleat; and
    (c) peripheral cleats advanced towards the central cleat and the arm of the at least one clamp rotated towards the central cleat.

8. The preform-charge fixture of claim 1 wherein at least one of the peripheral cleats and the upright members of the central cleat has a physical adaptation for guiding the preforms into the gap.

9. The preform-charge fixture of claim 8 wherein the physical adaptation of each peripheral cleat is at least one wall that tapers downwardly from an upper surface of the peripheral cleat to the forward wall thereof.

10. The preform-charge fixture of claim 8 wherein the physical adaptations of each upright member of the central cleat includes at least one wall that tapers downwardly from a top of each upright member towards a substantially vertical wall thereof.

11. The preform-charge fixture of claim 1 comprising a source of energy that heats the preforms, wherein the source of energy is movable into and out of a region defined within the upright members of the central cleat.

12. The preform-charge fixture of claim 1 further comprising a base plate, wherein the central cleat, the plurality of peripheral cleats, and the at least one clamp is disposed on the base plate, wherein:
    (a) the central cleat is located at a first fixed position on the base plate,
    (b) the plurality of peripheral cleats surrounds the central cleat, and
    (c) the upright member of each of the at least one clamps is located at respective ones of second fixed positions on the base plate.

13. The preform-charge fixture of claim 1 comprising means for softening the preforms.

14. The preform-charge fixture of claim 1 wherein the central cleat has four of the spaced apart upright members.

15. A preform-charge fixture that forms a preform charge from a plurality of preforms, the preform-charge fixture comprising:
    a central cleat, the central cleat having plural, spaced apart upright members;
    a plurality of peripheral cleats, each peripheral cleat having a forward wall and being movable towards (advanced) and away (retracted) from the central cleat, wherein, when moved towards the central cleat, a gap is formed between the forward wall of each peripheral cleat and the upright members of the central cleat, wherein the gap has a size suitable for positioning and restraining the preforms received therein against the upright members;
    one or more clamps physically configured to apply downward pressure to the preforms in the gap; and
    a source of energy that heats the preforms, wherein the source of energy is movable into and out of a region defined within the upright members of the central cleat.

16. The preform-charge fixture of claim 15 wherein there is one clamp for each peripheral cleat.

* * * * *